United States Patent
Monga et al.

(10) Patent No.: US 8,249,340 B2
(45) Date of Patent: Aug. 21, 2012

(54) DIMENSIONALITY REDUCTION METHOD AND SYSTEM FOR EFFICIENT COLOR PROFILE COMPRESSION

(75) Inventors: Vishal Monga, Webster, NY (US); Raja Bala, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 729 days.

(21) Appl. No.: 12/396,202

(22) Filed: Mar. 2, 2009

(65) Prior Publication Data

US 2010/0220926 A1 Sep. 2, 2010

(51) Int. Cl.
*G06K 9/36* (2006.01)

(52) U.S. Cl. ........ 382/166; 382/232; 382/248; 382/250; 382/251

(58) Field of Classification Search .......... 382/232, 382/251, 250, 248, 166; 358/2.1, 518, 500; 375/E7.144; 708/400; 341/65, 67
See application file for complete search history.

(56) References Cited

U.S. PATENT DOCUMENTS

| | | | | |
|---|---|---|---|---|
| 6,160,918 | A | * | 12/2000 | Pigeon ........................... 382/248 |
| 7,221,482 | B2 | * | 5/2007 | Yamazaki et al. ............. 358/2.1 |
| 2004/0257595 | A1 | | 12/2004 | Sharma et al. ................. 358/1.9 |

OTHER PUBLICATIONS

A. Balaji S.R, G. Sharma, M.Q. Shaw, R. Guay; Hierarchical Compression of Color Look Up Tables; 15th Color Imaging Conference Final Program and Proceedings, 2007.

* cited by examiner

*Primary Examiner* — Anh Hong Do
(74) *Attorney, Agent, or Firm* — Kermit D. Lopez; Luis M. Ortiz; Tuesday A. Kaasch (57) ABSTRACT

A dimensionality reduction method and system for efficient color transform compression is disclosed. A multi-dimensional color transform with an n-dimensional input color space can be received. A projection operator can be derived and applied to the n-dimensional input color space to form a k-dimensional input color space. A functional approximation can be designed to the n-dimensional input color space and can be evaluated on the k-dimensional input color space to form an m-dimensional output color space. The projection operator and the approximation function can be combined to form a compressed transform by mapping the n-dimensional input color space to m-dimensional output color space. Such an approach provides a significant reduction in size of the color profile with respect to storage and speeds-up real-time computation.

20 Claims, 7 Drawing Sheets

| EMULATION TRANSFORM/PROFILE | AVERAGE $\Delta E_{94}$ ERROR | 95% $\Delta E_{94}$ ERROR | MAX. $\Delta E_{94}$ ERROR |
|---|---|---|---|
| FULL-RESOLUTION 2-D EMULATION LUTS: PROFILE SIZE 684KB | 1.87 | 5.66 | 9.24 |
| SPARSE 2-D LUTS (FACTOR OF 4): PROFILE SIZE 112KB | 2.27 | 5.91 | 9.89 |
| SPARSE 4-D LUT (24^4*4): PROFILE SIZE 1.3MB | 2.30 | 6.02 | 10.13 |
| SPARSE 4-D LUT (16^4*4): PROFILE SIZE 256KB | 3.44 | 7.12 | 11.24 |

DIMENSIONALITY REDUCTION METHOD AND SYSTEM FOR EFFICIENT COLOR PROFILE COMPRESSION

TECHNICAL FIELD

Embodiments are generally related to data-processing systems and methods. Embodiments also relate in general to the field of computers and similar technologies and, in particular, to software utilized in this field. In addition, embodiments relate to dimensionality reduction techniques for color profile compression.

BACKGROUND OF THE INVENTION

Color transformations need to be applied to images and objects in many instances along an image path. Such transformations are often complex non-linear functions hence, it is impractical to process large images in real-time. It is therefore common to implement such mathematical color transforms as a multi-dimensional look-up-table (LUT). In the color management industry, LUTs are frequently implemented in International Color Consortium (ICC) profiles. In this patent, the term "color profile" will be interpreted as a container for a multidimensional LUT transform and possibly other elements (e.g. a 3×3 matrix, tone reproduction curves, etc.).

Color lookup tables (CLUTs) that provide transformations between various color spaces are extensively utilized in color management, common examples being the transformations from device independent color spaces such as CIELAB to device dependent color spaces (e.g. CMYK) and vice versa. CIELAB is a perceptually based color space specified by the International Commission of Illumination (Commission Internationale d'Eclairage, hence its CIE initialism). The CLUTs are often embedded in the printer hardware for color printers, which require relatively expensive flash memory for the purpose of storage. In such scenarios, the firmware memory requirements for storing the CLUTs can become a concern, particularly as the number of the lookup tables in color devices increases due to the need for supporting multiple color spaces, print media, halftones, preference, etc. The problem of prohibitively large profile or LUT sizes can become even more relevant as many newer color devices, for example, high-end color printers, utilize up to 7 or 8 color separations as opposed to the classical 4 separations. In practice, the look-up-table cannot be prohibitively large because of processor RAM and cache memory constraints.

One prior art approach to reduce storage is to employ sparser sampling along one or more input dimensions of the look-up-table. However, interpolation of sparse data using, for example, a technique such as linear interpolation, can introduce unacceptable error in the transform. Another prior art approach develops lossless compression of the LUT based on entropy coding in order to reduce storage. Such an approach can be efficient for on-chip storage, but the profile or transform must still be decoded back to its original size and loaded into memory for the application of the transform.

Based on the foregoing, it is believed that a need exists for an improved method and system for compressing a color profile to provide significant benefits in storage while allowing for fast real-time operation without loss of generality.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved data-processing method, system and computer-usable medium.

It is another aspect of the present invention to provide for an improved dimensionality reduction method and system for efficient color profile compression.

It is a further aspect of the present invention to provide for efficient and cost-effective color profiles.

The aforementioned aspects and other objectives and advantages can now be achieved as described herein. A dimensionality reduction method and system for efficient color transform compression is disclosed. A multi-dimensional color transform with an n-dimensional input color space can be received. A projection operator can be derived and applied to the n-dimensional input color space to form a k-dimensional input color space. A functional approximation can be designed to the n-dimensional input color space and can be evaluated on the k-dimensional input color space to form an m-dimensional output color space. The projection operator and the approximation function can be combined to form a compressed transform by mapping the n-dimensional input color space to m-dimensional output color space. Such an approach can provide a significant reduction in size of the color profile with respect to storage and can speed-up real-time computation.

Accordingly, a method for efficient color profile compression can include the steps of: extracting from the color profile a multidimensional color transform f( ) that maps color variables from a multi-dimensional input space of dimensionality n to another multi-dimensional output space of dimensionality m; deriving a projection operator P for projecting the n-dimensional input color variables to k-dimensional color variables, wherein k is less than n; calculating an approximation function g( ) for mapping said k-dimensional input color variables to said m-dimensional output color variables; combining the projection operator and approximation function to form a compressed multi-dimensional color transform which provides a significant reduction in size and speeds up real-time computation; and building a compressed profile from the compressed multi-dimensional transform.

Such an approach can be utilized to compress a four-dimensional emulation transform from a first device CMYK to a second device CMYK. The projection operator and the approximation function minimize the approximation error resulting from the compressed transform. The color transform can be compressed depending upon the projection operator or the lower-dimensional variables, which provide significant benefits in storage while still allowing for fast real-time operation. The dimensionality reduction method can be utilized in conjunction with entropy coding methods to provide significantly greater compression ratios.

In accordance with a system of the present invention, a color profile compression system can be provided including an extraction module capable of extracting from the color profile a multidimensional color transform f( ) that maps color variables from a multi-dimensional input space of dimensionality n to another multi-dimensional output space of dimensionality m. A derivation module can be provided that is capable of deriving a projection operator P for projecting the n-dimensional input color variables to k-dimensional color variables, wherein k is less than n. A microprocessor is provided that is capable of calculating an approximation function g( ) for mapping said k-dimensional input color variables to said m-dimensional output color variables, combining the projection operator and approximation function to form a compressed multi-dimensional color transform which provides a significant reduction in size and speeds up realtime computation; and building a compressed profile from the compressed multi-dimensional transform.

Accordingly, a color profile compression system can include a color profile compression system, comprising: an extraction module capable of extracting from the color profile a multidimensional color transform f( ) that maps color variables from a multi-dimensional input space of dimensionality n to another multi-dimensional output space of dimensionality m; a derivation module capable of deriving a projection operator P for projecting the n-dimensional input color variables to k-dimensional color variables, wherein k is less than n, and for calculating an approximation function g( ) for mapping said k-dimensional input color variables to said m-dimensional output color variables; a processing module capable of combining the projection operator and approximation function to form a compressed multi-dimensional color transform which provides a significant reduction in size and speeds up real-time computation; and building a compressed profile from the compressed multi-dimensional transform.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied, are cited merely to illustrate at least one embodiment, and are not intended to limit the scope of such embodiments.

Figure 1:
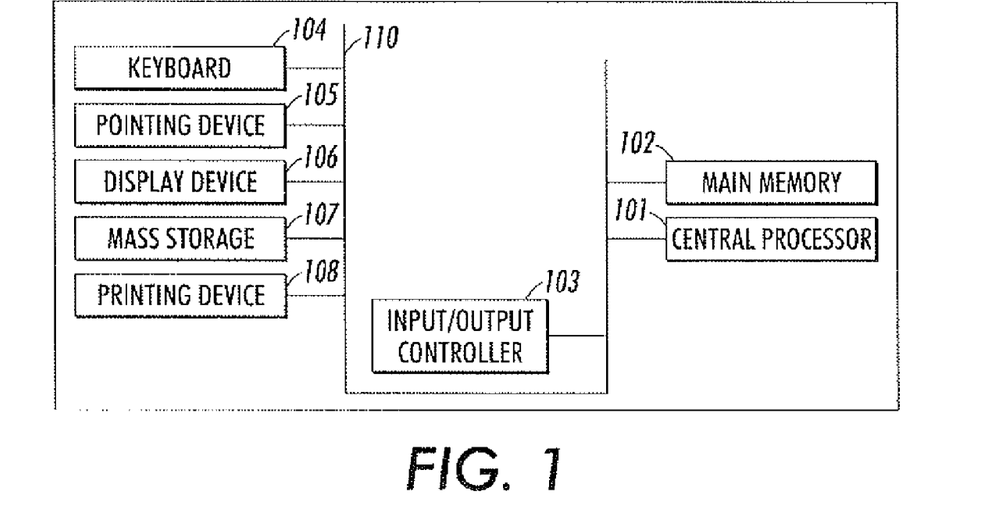
FIG. 1 illustrates a schematic view of a computer system in which the present invention can be embodied.
Figure 2:
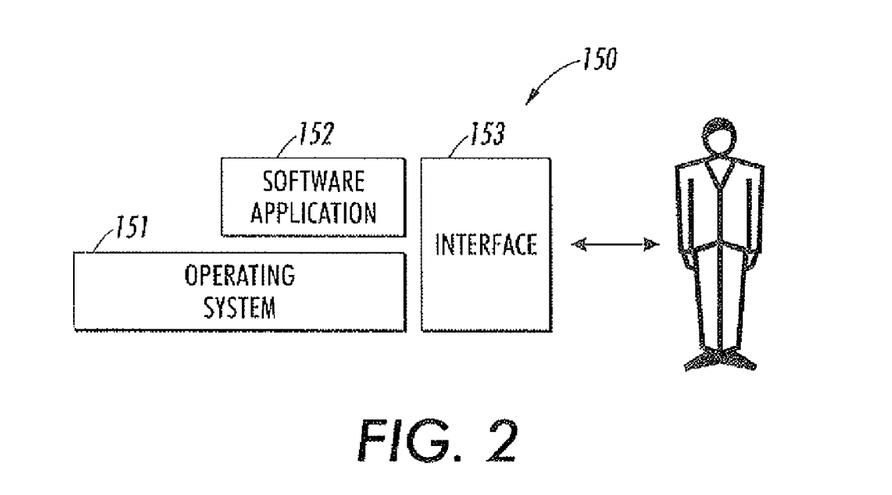
FIG. 2 illustrates a schematic view of a software system including an operating system, application software, and a user interface that can be used for carrying out the present invention.

FIGS. 1-2 are provided as exemplary diagrams of data processing environments in which embodiments of the present invention can be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

As depicted in FIG. 1, the present invention may be embodied in the context of a data-processing apparatus 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the data-processing apparatus 100 as desired. As illustrated, the various components of the data-processing apparatus 100 communicate through a system bus 110 or similar architecture.

Illustrated in FIG. 2, a computer software system 150 is provided for directing the operation of the data-processing apparatus 100. Software system 150, which is stored in system memory 102 and on disk memory 107, includes a kernel or operating system 151 and a shell or interface 153. One or more application programs, such as application software 152, may be "loaded" (i.e., transferred from storage 107 into memory 102) for execution by the data-processing apparatus 100. The data-processing apparatus 100 receives user commands and data through user interface 153; these inputs may then be acted upon by the data-processing apparatus 100 in accordance with instructions from operating module 151 and/or application module 152.

The interface 153, which is preferably a graphical user interface (GUI), also serves to display results, whereupon the user may supply additional inputs or terminate the session. In an embodiment, operating system 151 and interface 153 can be implemented in the context of a "Windows" system. Application module 152, on the other hand, can include instructions, such as the various operations described herein, with respect to the various components and modules described herein such as, for example, the method 900 depicted in FIG. 9.

The following description is presented with respect to embodiments of the present invention, which can be embodied in the context of a data-processing system such as data-processing apparatus 100 and computer software system 150 respectively FIGS. 1-2. The present invention, however, is not limited to any particular application or any particular environment. Instead, those skilled in the art will find that the system and method of the present invention may be advantageously applied to a variety of system and application software, including database management systems, word processors, and the like. Moreover, the present invention may be embodied on a variety of different platforms, including Macintosh, UNIX, LINUX, and the like. Therefore, the description of the exemplary embodiments, which follows, is for purposes of illustration and not considered a limitation.

In accordance with features of the system of the present invention, a color profile compression system is provided as and is operable within the system described in FIGS. 1 and 2 including software operating in application module 152 in the form of an extraction module capable of extracting from the color profile a multidimensional color transform f( ) that maps color variables from a multi-dimensional input space of dimensionality n to another multi-dimensional output space of dimensionality m. Also, operable in application module

152, a derivation module can be provided that is capable of deriving a projection operator P for projecting the n-dimensional input color variables to k-dimensional color variables, wherein k is less than n, and calculating an approximation function g( ) for mapping said k-dimensional input color variables to said m-dimensional output color variables. A processing module 101 (central processor) is adapted with the software for combining the projection operator and approximation function to form a compressed multi-dimensional color transform which provides a significant reduction in size and speeds up real-time computation and for building a compressed profile from the compressed multi-dimensional transform.

Figure 3:
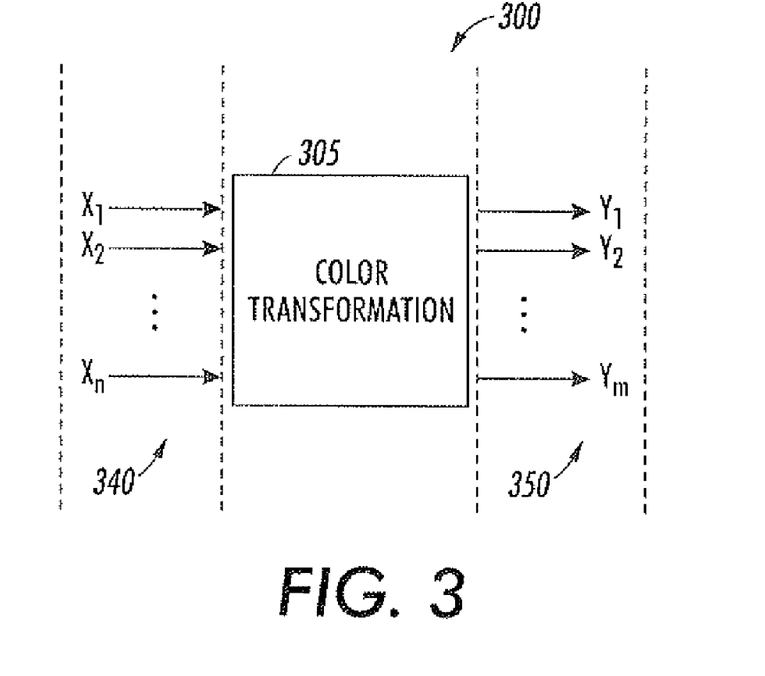
FIG. 3 illustrates a block diagram of a multi-dimensional color transformation system, in accordance with a preferred embodiment.

FIG. 3 illustrates a block diagram of a multi-dimensional color transformation system 300, in accordance with a preferred embodiment. The multi-dimensional color transformation system 300 generally includes an n-dimensional input color space 340 that can be transformed to an m-dimensional output color space 350 utilizing a color transformation 305. The color transformation 305 transforms the n-dimensional input color space 340 to the m-dimensional output color space 350 without loss of generality. The n-dimensional input color space 340 can be represented as x. The true higher dimensional color transform 305 can be represented as f, as indicated in equation (1) as follows:

$$f: x \rightarrow y \qquad (1)$$

wherein y represents the output of the color transformation 305.

Figure 4:
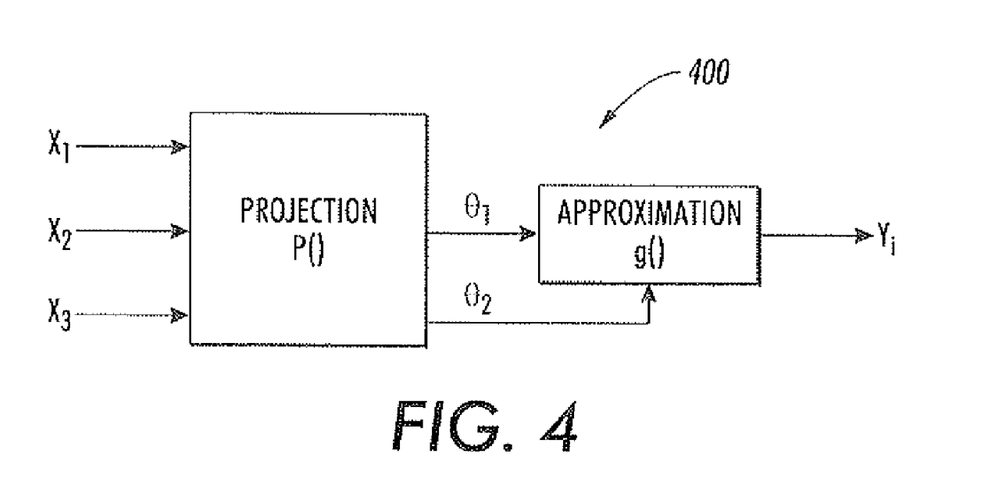
FIG. 4 illustrates a block diagram of a compressed multi-dimensional transformation system, in accordance with a preferred embodiment.

FIG. 4 illustrates a block diagram of a compressed multi-dimensional transformation system 400 for specific n-dimensional inputs x=[x1, . . . xn], in accordance with the preferred embodiment. A projection operator P( ) is used for the transformation of data in n-dimensional input color space x=[x1, . . . xn], to data in a k-dimensional input color space. The projection is denoted by operator θ. The k-dimensional data is then transformed to the m-dimensional output color space y=[y1, . . . , ym] utilizing the approximation function g( ) to obtain a compressed color transform or profile. The compressed color profile or transformation can be formulated as a design of the projection operator P( ) and the approximation function g( ) that minimizes the approximation error resulting from the compressed transform. The compressed transform system can be formulated as shown in equation (2), which describes a mean squared-error metric:

$$(P^*, g^*) = \underset{(P,g)}{\operatorname{argmin}} \oint_X \|f(x) - g(\theta)\|^2 dx, \text{ where } \theta = P(x) \qquad (2)$$

wherein θ in equation (2) represents the projection of x on to a k-dimensional input space, wherein k<n. In general, the projection operator P( ) and the approximation function g( ) can be parameterized and formally solved as a joint optimization problem with the cost function as shown in equation (2). Note, however, other metrics can also be utilized. A heuristic approach combined with insight about device characteristics can also be utilized to derive close-to-optimal functions.

The projection operator P( ) captures any geometric redundancies in the transform. Often, physical insight may guide the design of the projection operator P( ). For example, an RGB to R' G' B' transform can be designed with a primary dependence of output R' on the input R, and analogously for G, B. The gamma correction commonly applied for displaying images on a monitor may be viewed as an instantiation of the above framework for the case such as n=3, k=1, and θR=R, θG=G, θB=B. Note that in this case, there are actually three projection operators, each of which project 3-D color space to a 1-D color space. Note also that the projection operator P( ) must be simple to be executed in real time in the image path.

The approximation function g( ) is designed to approximate the original function f( ). The approximation function g( ) is evaluated on the k-dimensional inputs θ. Once the projection operator P( ) is designed, the approximation function g( ) can be solved for utilizing search-based techniques to yield the closest possible approximation in equation (2). In the gamma correction example, g(θ)-[θR ┆θ G ┐θ B ┐]T. The compressed color profile obtained from the approximation function g( ) can be implemented as a k-dimensional LUT, which can be opposed to the original n-dimensional LUT.

Figure 5:
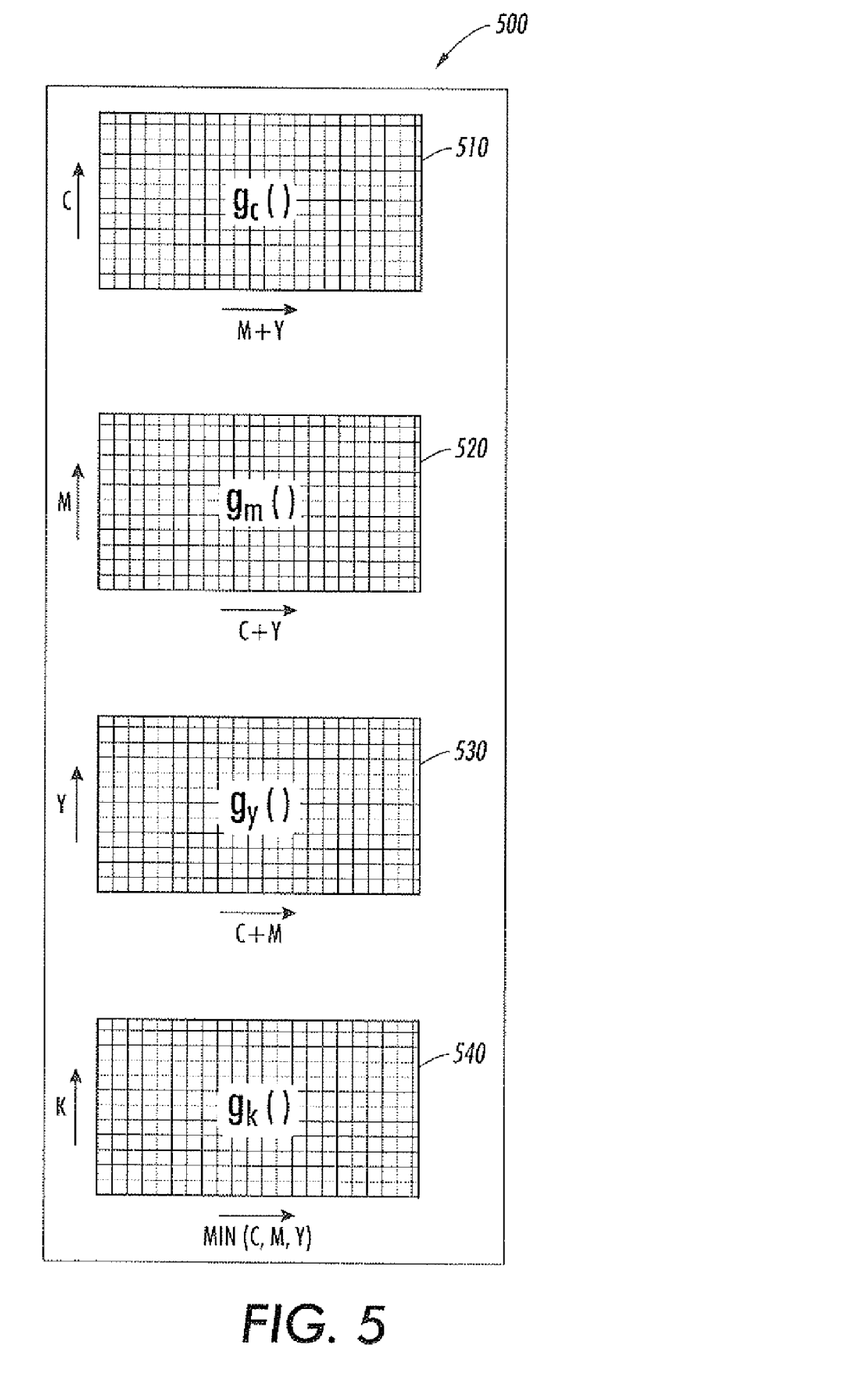
FIG. 5 illustrates two-dimensional emulation look-up-tables for CMYK, in accordance with a preferred embodiment.
Figure 6:
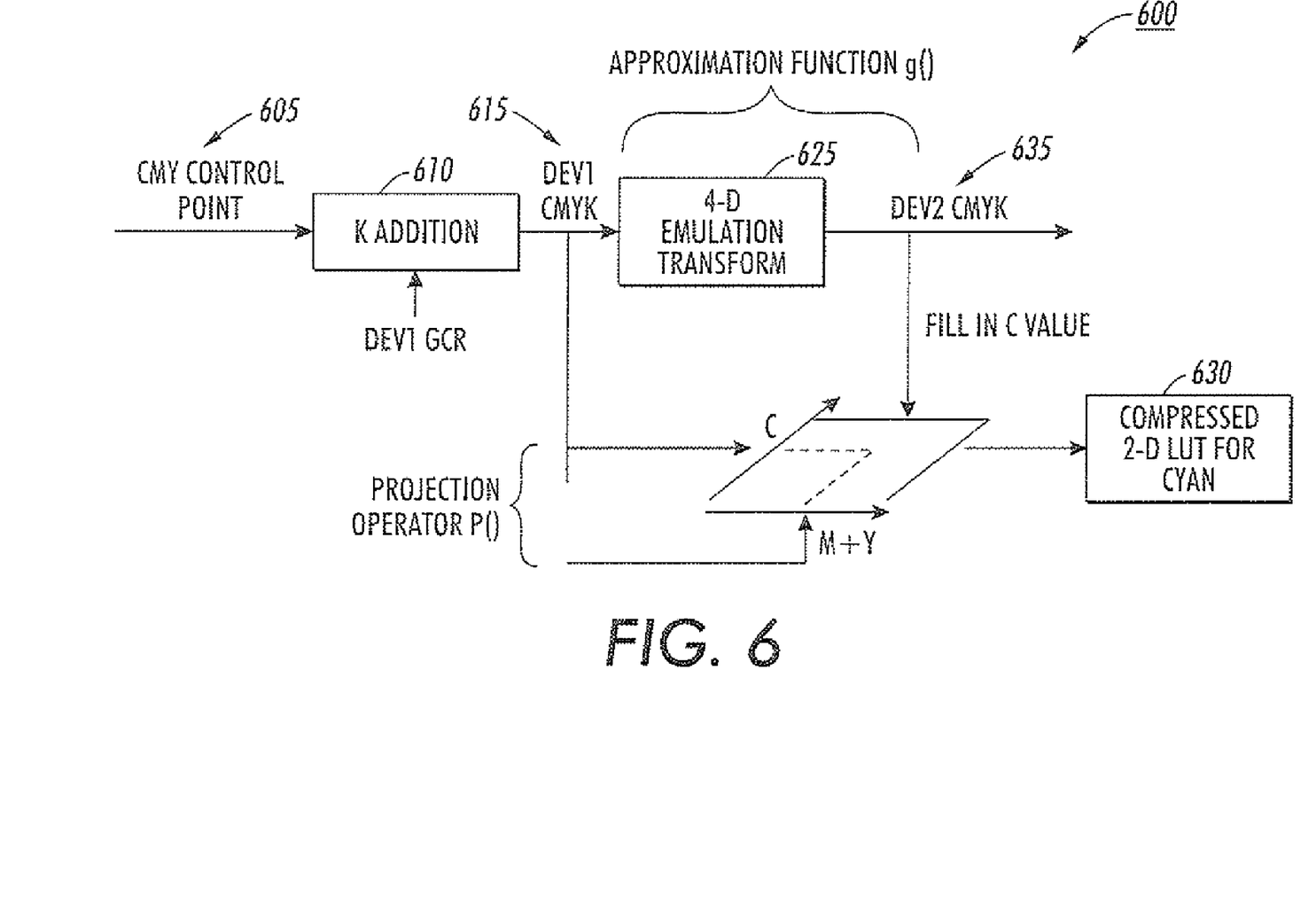
FIG. 6 illustrates a block diagram for evaluating a compressed two-dimensional emulation LUT for cyan channel, in accordance with an exemplary embodiment.

FIG. 5 illustrates the preferred embodiment where n=m=4 and k=2. A projection operator P( ) converts the 4-dimensional input color to a 2-dimensional intermediate color space. This is followed by an approximation function g( ) that is implemented as a series of two-dimensional emulation look-up-tables 500 that best approximate an original four-dimensional emulation transform, such as transform 625 illustrated in FIG. 6. The 4-dimensional emulation transform is a mapping from the CMYK (cyan, magenta, yellow, and black) 615 corresponding to a first device (denoted DEV1) to CMYK 635 corresponding to a second device (denoted DEV2), as shown in FIG. 6. The projection operator P( ) comprises a plurality of projections for mapping CMYK to a series of two-dimensional spaces and can be defined as in equation (3). The resulting two-dimensional spaces are then converted to the output 4-dimensional spaces with the use of four two-dimensional look-up-tables 510, 520, 530 and 540 that output cyan, magenta, yellow, and black, respectively.

$$\theta_c = [C, M+Y] \theta_m = [M, C+Y] \theta_y = [Y, C+M] \theta_k = [K, \min(C, M, Y)] \qquad (3)$$

The projection operator defined collectively by θc, θm, θy, and θk, as depicted in equation (3), can be derived based on insight on device characteristics and known correlations among the input C, M, Y, K data. The lower dimensional emulation look-up-tables 600 are then filled with approximation functions gc( ), gm( ), gy( ), gk( ) for cyan, magenta, yellow and black, respectively, that best approximate the original 4-D emulation transform.

FIG. 6 illustrates a block diagram 600 for deriving and evaluating a compressed transform for the cyan channel, in accordance with the preferred embodiment. The CMY control point 605 along with a first device GCR (gray-component replacement) and a k-addition 610 forms a first device CMYK 615. The SWOP CMYK 615 can be compressed to an second device CMYK 635 by utilizing the projection operator P( ) and the approximation function g( ) associated with the four-dimensional emulation transform 625. A series of two-dimensional planes in the four-dimensional first device CMYK 615 can be projected with minimal aliasing onto the two-dimensional space defined by the compressed LUTs 510, 520, 530 and 540 as shown on FIG. 5. These planes are then mapped through the four-dimensional transform 625 and the resulting values of the second device CMYK 635 can be filled into the two-dimensional LUTs 510, 520, 530 and 540 resulted from projection operator θ. Similarly, a one-dimensional axes can be utilized as the manifolds instead of two-dimensional planes and some form of interpolation can be utilized to fill in missing LUT entries.

In addition, CMYK combinations found in common first device images do not encompass all of the CMYK space, but are constrained to a three-dimensional subspace defined by the gray-component-replacement (GCR) strategy. The GCR constraint can also be incorporated into the process of identifying CMYK manifolds that can be utilized to populate the two-dimensional LUTs. For example, the C value from the second device CMYK 635 can be filled into the two-dimensional LUTs in order to form a compressed lower dimensional emulation LUT 610 for the cyan channel. The four-dimensional emulation transform 625 utilized as the ground truth in dimensionality reduction technique with a sampling density of $33^4$ and approximately of size $1.13 \times 4 = 4.52$ Mb. The three full-resolution two-dimensional LUTs 610, 620 and 630 for cyan, magenta and yellow are of size 128 Kb each, while the two-dimensional LUT 640 for K occupies 64 Kb resulting in a total transform size of 648 Kb. The color profiles can be compressed depending upon the projection operator P( ) or the lower-dimensional variables, which provide significant benefits in storage while still allowing for fast real-time operation.

Figure 7:
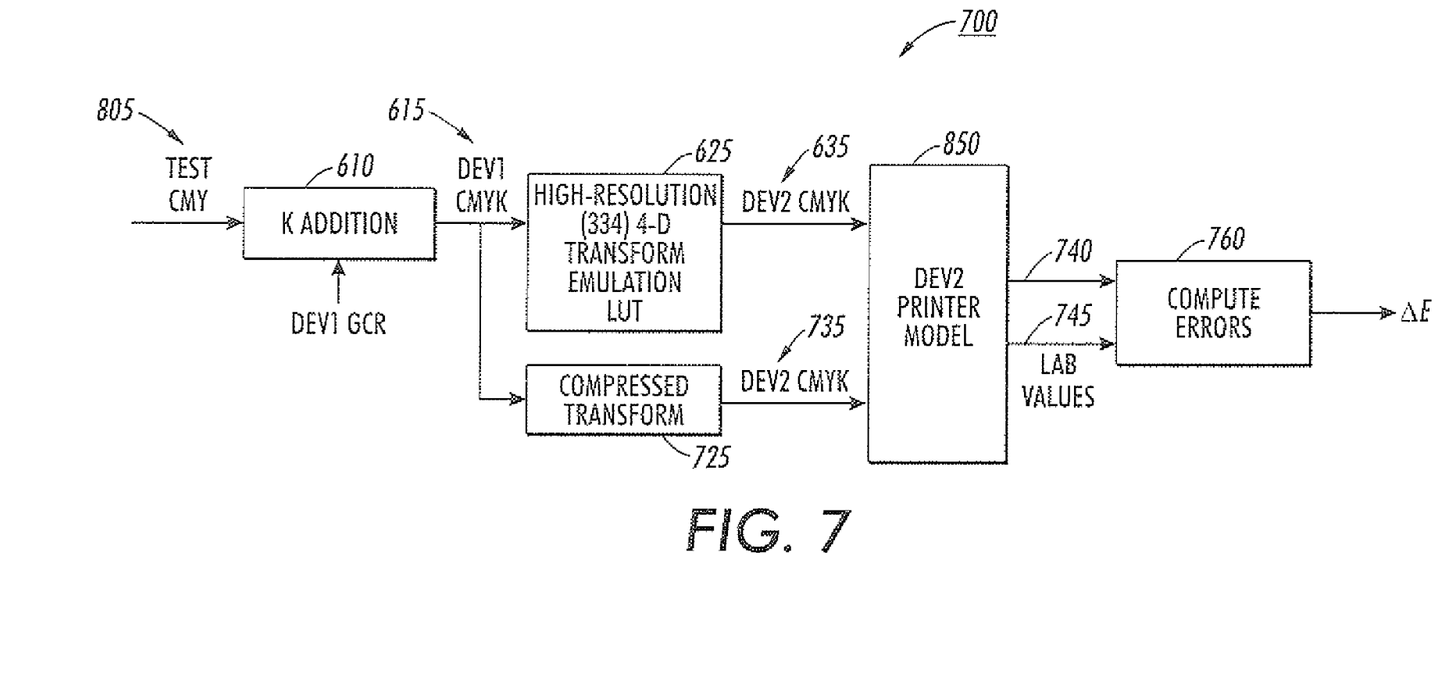
FIG. 7 illustrates a block diagram for evaluating compressed transform against a high-resolution color transform, in accordance with a preferred embodiment.

FIG. 7 illustrates a block diagram 700 for evaluating compressed transform against a high-resolution color transform, in accordance with the preferred embodiment. The evaluation methodology 700 can be utilized to prove the experimental results of a compressed emulation transform 725 obtained by the dimensionality reduction technique. The test CMY 805 can be converted to a first device CMYK 615 utilizing the first device GCR and k addition 610. The first device CMYK 615 can be given as inputs to the high-resolution four-dimensional emulation transform 625 and the compressed transform 725, which generates different second device CMYK outputs 635 and 735. The second device CMYK outputs 635 and 735 are subsequently input to iGEN printer model 850 for generating CIELab values 740 and 745. Error codes 760 can be computed utilizing the CIELab values 740 and 745, which results the change in the compressed transform that is illustrated by ΔE.

Figure 8:
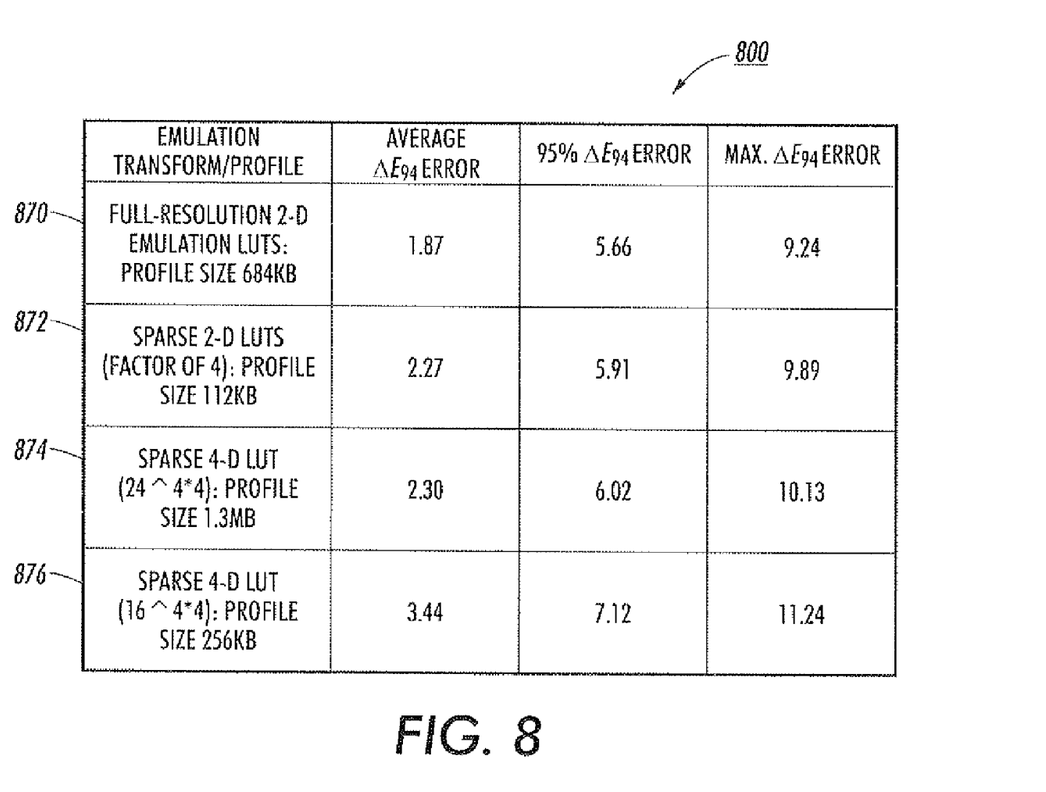
FIG. 8 illustrates a table depicting errors between the compressed transform and the high-resolution color transform, in accordance with a preferred embodiment.

FIG. 8 illustrates a table 800 depicting errors between a compressed transform 725 and a four-dimensional color transform 625, in accordance with the preferred embodiment. Table 800 reveals errors for several different design choices for the compressed profile or transform. In particular, two sparse four-dimensional transforms 874 and 876 and two instantiations of two-dimensional transforms 870 and 872 can be utilized. In the sparse two-dimensional transforms 870 and 872, the missing values can be determined in real-time by utilizing a bilinear interpolation. The two-dimensional transform 870 reveals that the dimensionality reduction still retains most of the accuracy (average error of 1.87 delta E) of the high-resolution 4-dimensional emulation transform while providing a compression factor of almost 9. The results in the subsequent rows 872, 874 and 876 indicate that as the LUT size is decreased by sub-sampling, the two-dimensional emulation transform degrades much more gracefully than its four-dimensional counterpart. In particular, a 112 Kb 2-dimensional profile still outperforms a four-dimensional emulation transform/profile of size 1.3 Mb. The results can be decreased significantly for four-dimensional as the profile size drops to 256 Kb.

Figure 9:
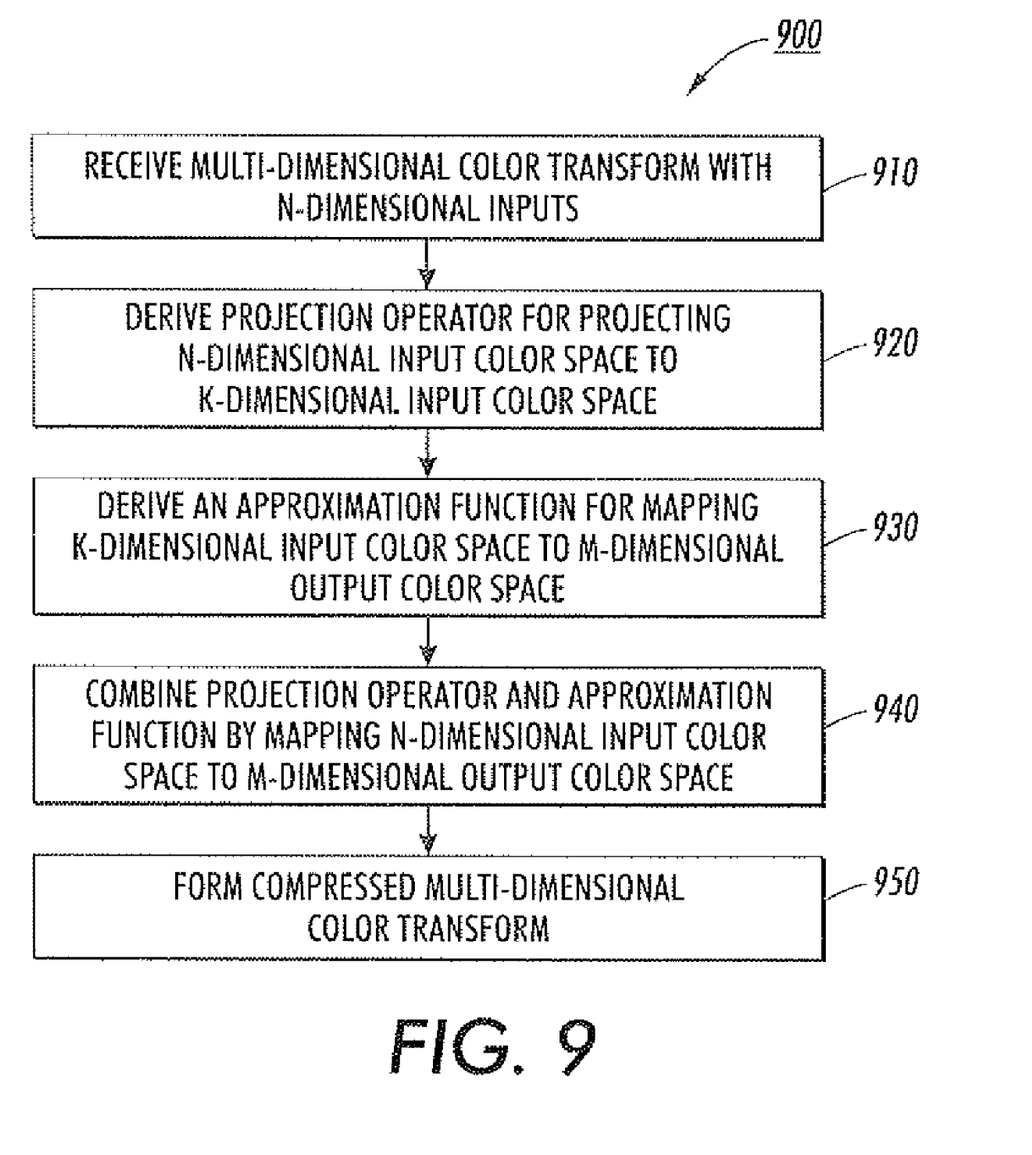
FIG. 9 illustrates a detailed flow chart of operations illustrating logical operational steps of a method for compressing a color transform utilizing dimensionality reduction technique, in accordance with a preferred embodiment.

FIG. 9 illustrates a detailed flow chart 900 of operations illustrating logical operational steps of a method 900 for compressing a color profile, in accordance with a preferred embodiment. Note that the method shown in flow chart 900 can be implemented in the context of a computer-useable medium that contains a program product. The flow diagram 900 depicted in FIG. 9 can also be implemented in a computer-usable medium containing a program product.

Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), system memory such as, but not limited to, Random Access Memory (RAM), and communication media, such as computer and telephone networks including Ethernet, the Internet, wireless networks, and like network systems. It should be understood, therefore, that such signal-bearing media, when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent. Thus, the method 900 described herein can be deployed as process software in the context of a computer system or data-processing system as that depicted in FIGS. 1-2.

Note that as illustrated in FIG. 9, the multi-dimensional color transform with n-dimensional inputs can be received, as depicted at block 910. A projection operator P( ) can be derived for projecting the n-dimensional input color space to obtain k-dimensional input color space, as depicted at block 920. An approximation function g( ) can be derived for mapping the k-dimensional input color space to m-dimensional output color space, as depicted at block 930. The projection operator P( ) and the approximation function g( ) can be combined by mapping the n-dimensional input color space 340 to the m-dimensional output color space, as depicted at block 940. Thereafter, compressed multi-dimensional color transform can be formed, as illustrated at block 950. Such an approach provides a significant reduction in size of the color profile with respect to storage and/or computation and speeds-up real-time computation. The dimensionality reduction method 900 can be utilized in conjunction with lossless compression techniques such as entropy coding methods to provide significantly greater compression ratios.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-usable medium for efficient color profile compression, said computer-usable medium embodying computer program code, said computer program code comprising instructions executed by a computer for:
   extracting from the color profile a multidimensional color transform f( )that maps color variables from a multi-dimensional input space of dimensionality n to another multi-dimensional output space of dimensionality m;
   deriving a projection operator P for projecting the n-dimensional input color variables to k-dimensional color variables, wherein k is less than n;
   calculating an approximation function g( )for mapping said k-dimensional input color variables to said m-dimensional output color variables;
   combining the projection operator and approximation function to form a compressed multi-dimensional color transform which provides a significant reduction in size and speeds up real-time computation; and
   building a compressed profile from the compressed multi-dimensional transform.

2. The computer-usable medium of claim 1 further comprising:
   obtaining said projection operator and said approximation function as the result of an optimization problem.

3. The computer-usable medium of claim 2, wherein the said optimization problem minimizes an error between the said compressed transform and the said multi-dimensional color transform.

4. The computer-usable medium of claim 2 further comprising:
obtaining the said projection operator P and said approximation function g( ) by solving the following problem:

$$(P^*, g^*) = \underset{(P,g)}{\operatorname{argmin}} \oint_X \|f(x) - g(\theta)\|^2 dx, \text{ where } \theta = P(x)$$

wherein P*, g* represent the optimal selections for the said projection operator and said approximation function.

5. The computer-usable medium of claim 1, wherein the said multi-dimensional transform f( ) is a mapping from the device color space of a first printer to the device color space of a second printer.

6. The computer-usable medium of claim 1, wherein said multi-dimensional color transform f( ) is a mapping from a device color space such as RGB, CMYK to a device independent space such as CIELAB and vice-versa.

7. The computer-usable medium of claim 2, wherein the said multi-dimensional transform f( ) is a mapping from the device color space of a first printer to the device color space of a second printer.

8. The computer-usable medium of claim 2, wherein said multi-dimensional color transform f( ) is a mapping from a device color space such as RGB, CMYK to a device independent space such as CIELAB and vice-versa.

9. The computer-usable medium of claim 3, wherein the said multi-dimensional transform f( ) is a mapping from the device color space of a first printer to the device color space of a second printer.

10. The computer-usable medium of claim 3, wherein said multi-dimensional color transform f( ) is a mapping from a device color space such as RGB, CMYK to a device independent space such as CIELAB and vice-versa.

11. The computer-usable medium of claim 1, wherein said multi-dimensional transform f( ) is a mapping from the device color space of a first printer to the device color space of a second printer.

12. A processor-readable medium embodying computer-executable program instructions for compressing a multidimensional color transform f( ) that maps color variables from a multi-dimensional input space of dimensionality n to another multi-dimensional output space of dimensionality m, comprising:
deriving a projection operator P for projecting the n-dimensional input color variables to k-dimensional color variables, wherein k is less than n, by executing a program instruction in a computer system;
calculating an approximation function g( ) for mapping said k-dimensional input color variables to said m-dimensional output color variables, by executing a program instruction in a computer system; and
using the projection operator and approximation function to form a compressed multi-dimensional color transform which provides a significant reduction in size, by executing a program instruction in a computer system.

13. The processor-readable medium of claim 12 further comprising:
obtaining said projection operator and said approximation function as the result of an optimization problem, by executing a program instruction in a computer system.

14. The processor-readable medium of claim 13, wherein the said optimization problem minimizes an error between the said compressed transform and the said multi-dimensional color transform.

15. The processor-readable medium of claim 13 further comprising:
obtaining the said projection operator P and said approximation function g( ) by solving the following problem, by executing a program instruction in a computer system:

$$(P^*, g^*) = \underset{(P,g)}{\operatorname{argmin}} \oint_X \|f(x) - g(\theta)\|^2 dx, \text{ where } \theta = P(x)$$

wherein P*, g* represent the optimal selections for the said projection operator and said approximation function.

16. The processor-readable medium of claim 13, wherein the said multi-dimensional transform f( ) is a mapping from the device color space of a first printer to the device color space of a second printer.

17. A color profile compression system, comprising:
an extraction module capable of extracting from the color profile a multidimensional color transform f( ) that maps color variables from a multi-dimensional input space of dimensionality n to another multi-dimensional output space of dimensionality m;
a derivation module capable of deriving a projection operator P for projecting the n-dimensional input color variables to k-dimensional color variables, wherein k is less than n, and for calculating an approximation function g( ) for mapping said k-dimensional input color variables to said m-dimensional output color variables;
a processing module capable of combining the projection operator and approximation function to form a compressed multi-dimensional color transform which provides a significant reduction in size and speeds up real-time computation; and
building a compressed profile from the compressed multi-dimensional transform.

18. The color profile compression system of claim 17, wherein the derivation module obtains the said projection operator and said approximation function as the result of an optimization problem.

19. The color profile compression system of claim 18, wherein the said optimization problem minimizes an error between said compressed transform and the said multi-dimensional color transform.

20. The color profile compression system of claim 18, wherein the derivation module obtains the said projection operator P and said approximation function g( ) by solving the following problem:

$$(P^*, g^*) = \underset{(P,g)}{\operatorname{argmin}} \oint_X \|f(x) - g(\theta)\|^2 dx, \text{ where } \theta = P(x)$$

wherein P*, g* represent the optimal selections for the said projection operator and said approximation function.

* * * * *